Figure 2:
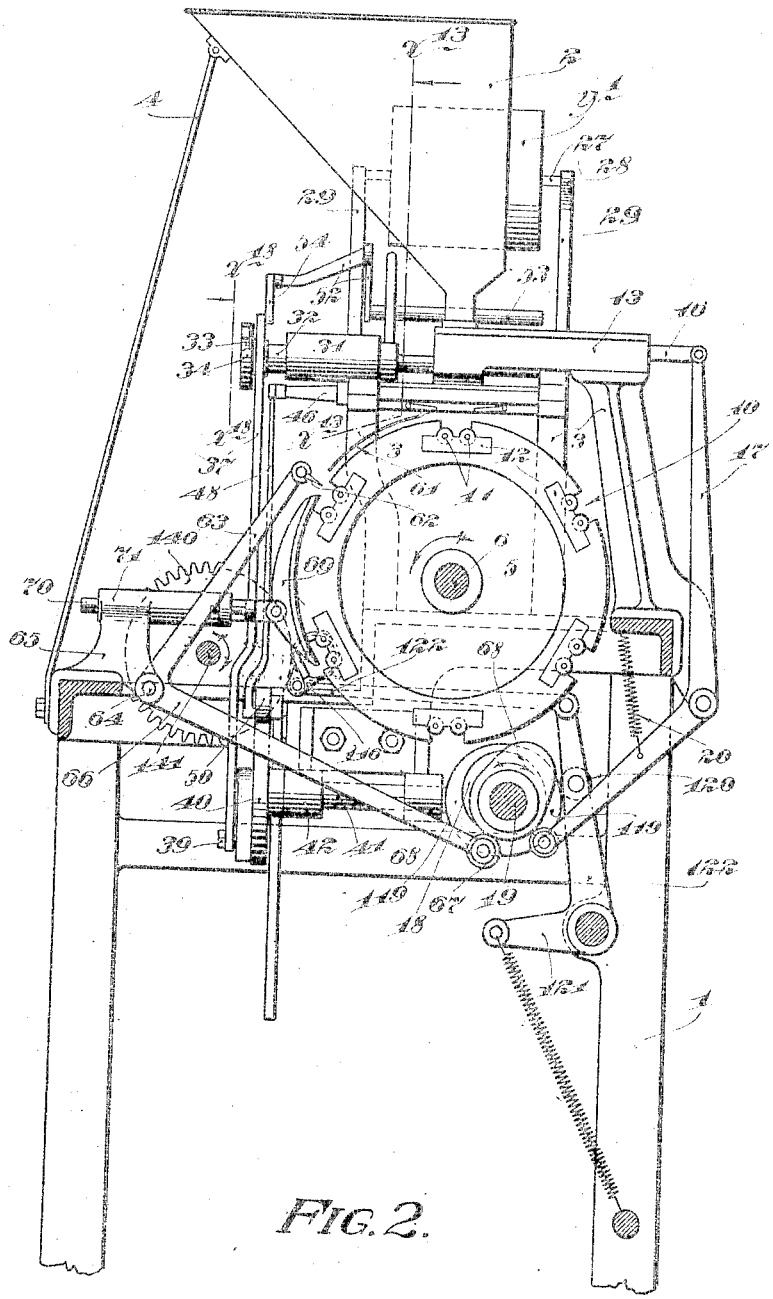

W. W. BUHSE.
CANDY WRAPPING MACHINE.
APPLICATION FILED JAN. 17, 1913.
1,116,560.
Patented Nov. 10, 1914.
10 SHEETS—SHEET 1.
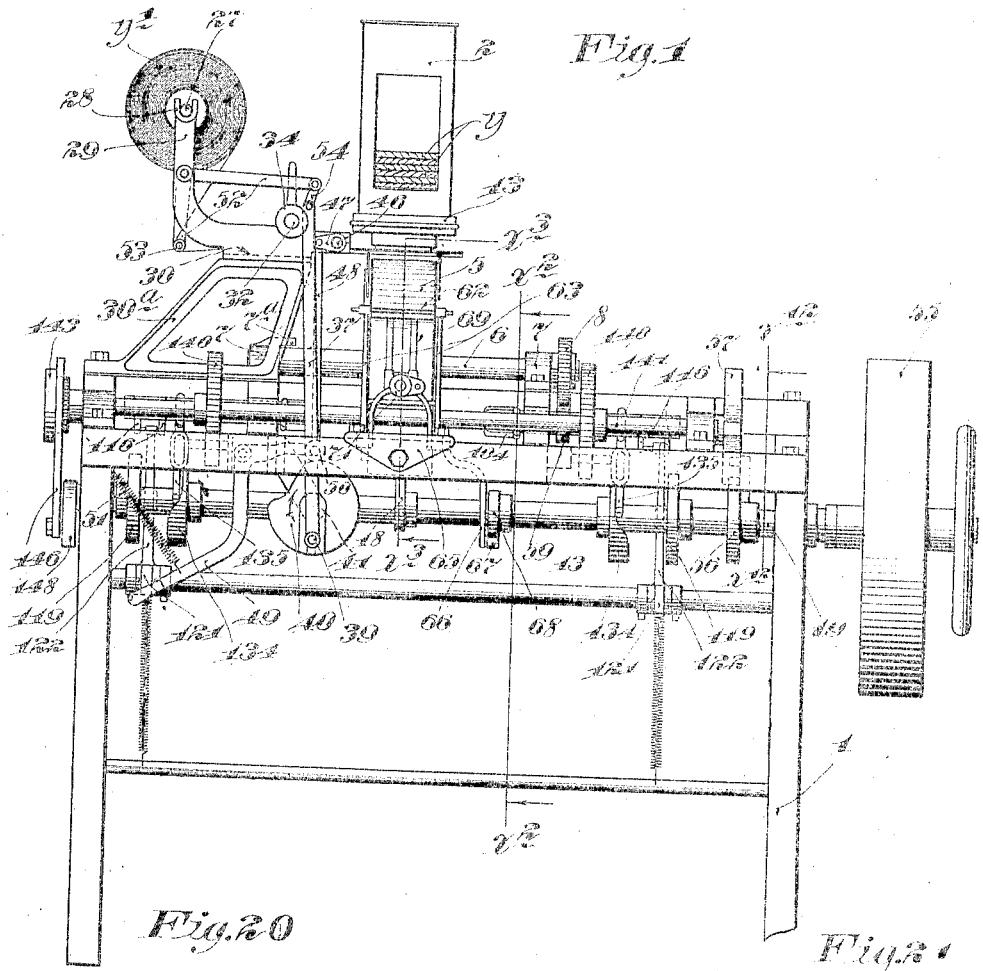
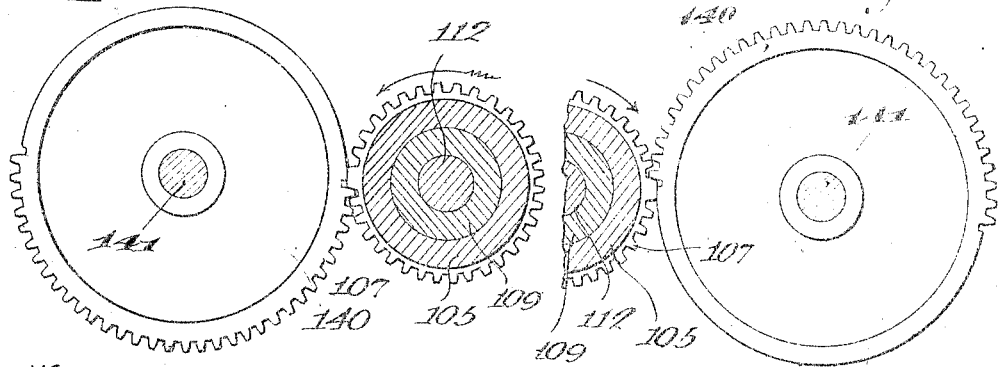
WITNESSES
W. E. Naylor
J. Jessen
INVENTOR
WALTER W. BUHSE.
BY William Merchant
his ATTORNEYS

W. W. BUHSE.
CANDY WRAPPING MACHINE.
APPLICATION FILED JAN. 17, 1913.

1,116,560.

Patented Nov. 10, 1914.
10 SHEETS—SHEET 3.

WITNESSES
W. E. Naylor
J. Jessen

INVENTOR
WALTER W. BUHSE
BY Williamson Merchant
his ATTORNEYS

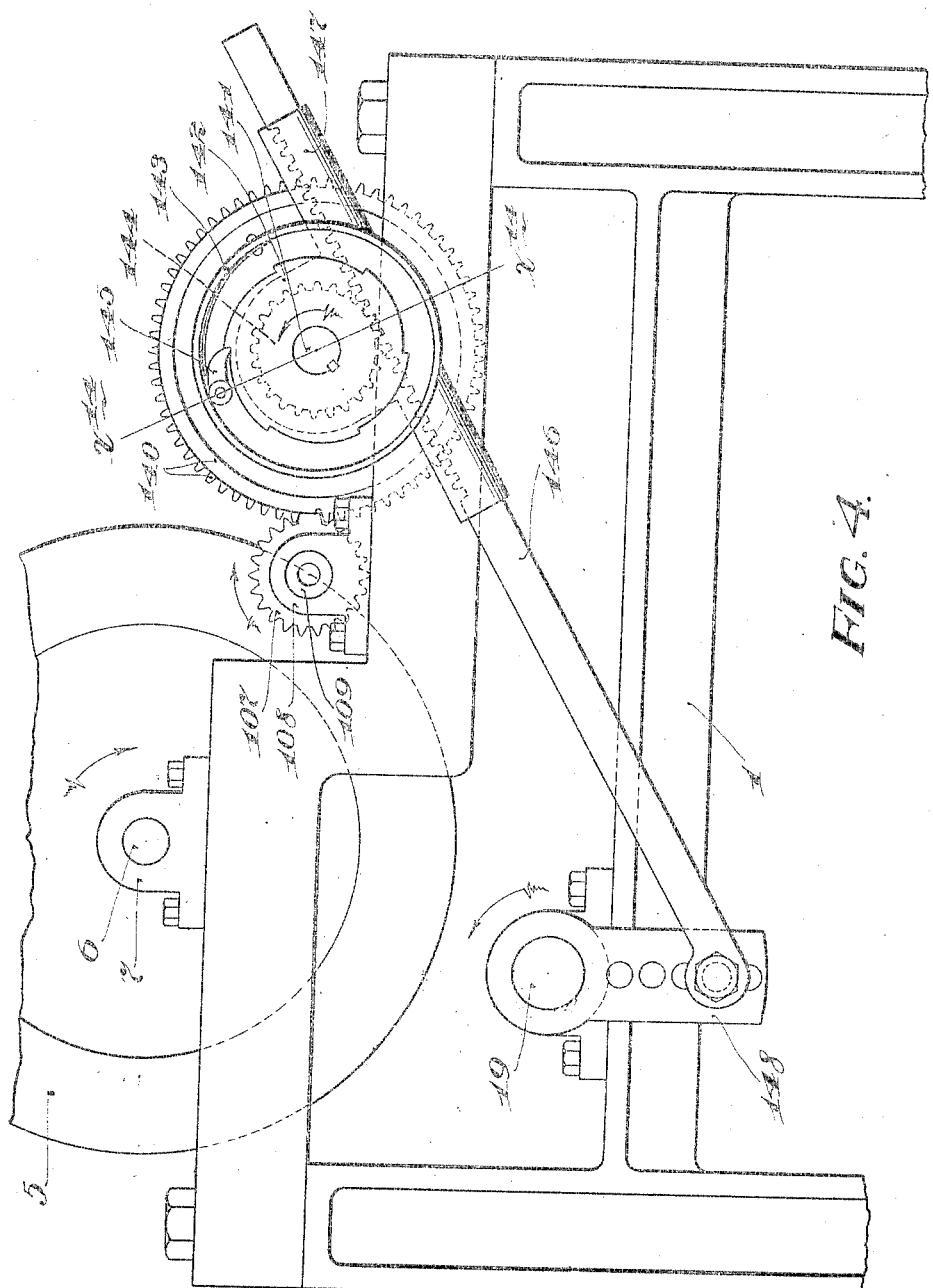

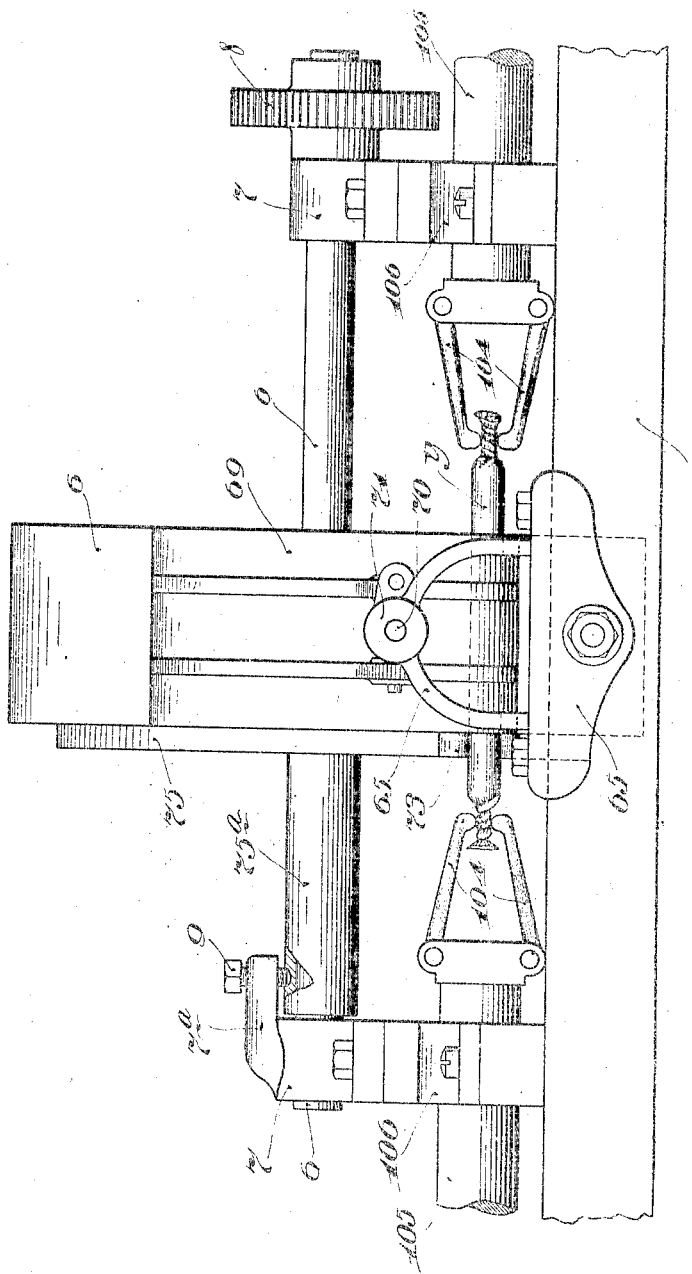

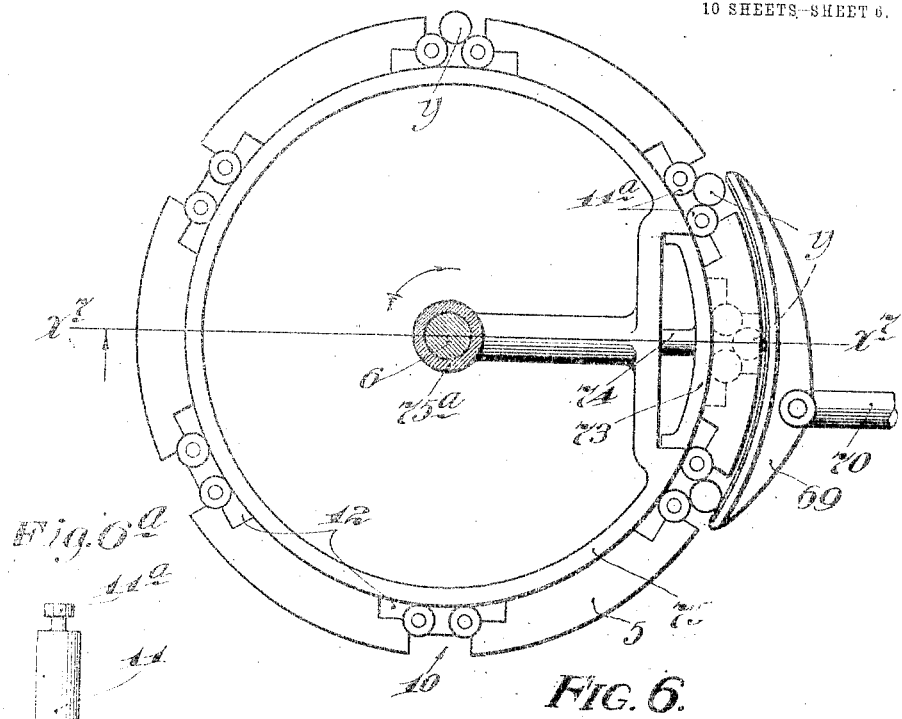
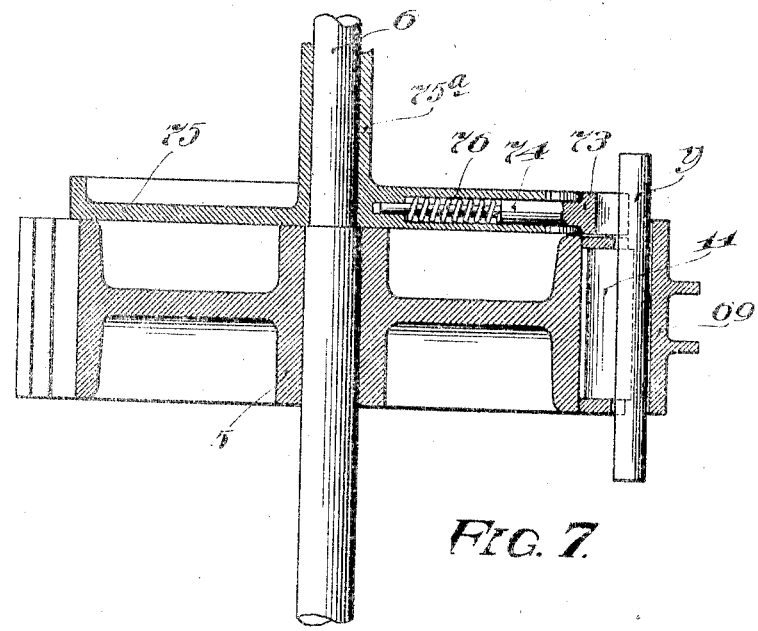

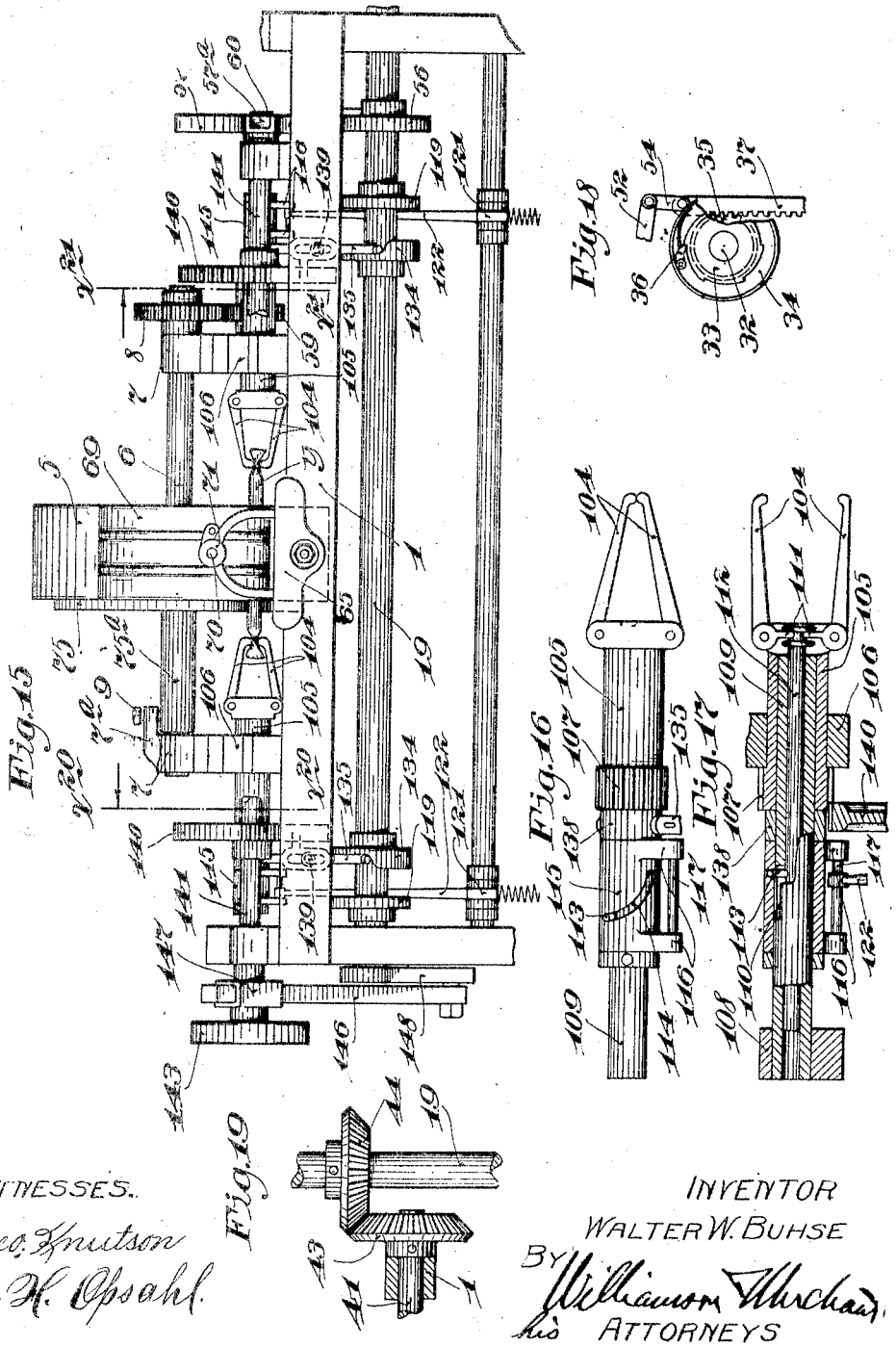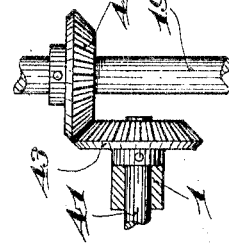

UNITED STATES PATENT OFFICE.

WALTER W. BUHSE, OF MINNEAPOLIS, MINNESOTA, ASSIGNOR TO BUHSE MACHINE MANUFACTURING COMPANY, OF MINNEAPOLIS, MINNESOTA, A CORPORATION OF MINNESOTA.

CANDY-WRAPPING MACHINE.

1,116,560.   Specification of Letters Patent.   Patented Nov. 10, 1914.

Application filed January 17, 1913. Serial No. 742,623.

*To all whom it may concern:*

Be it known that I, WALTER W. BUHSE, a citizen of the United States, residing at Minneapolis, in the county of Hennepin and State of Minnesota, have invented certain new and useful Improvements in Candy-Wrapping Machines; and I do hereby declare the following to be a full, clear, and exact description of the invention, such as will enable others skilled in the art to which it appertains to make and use the same.

Generally, my invention relates to parcel wrapping machines, but has for its particular object the provision of a simple and efficient machine for wrapping stick candy or articles of similar form. Generally stated, the invention consists of the novel devices and combinations of devices hereinafter described and defined in the claims.

As a brief outline of what is accomplished by the improved machine, it may be stated that the sticks of candy, for example, which are to be wrapped, are placed in a suitable hopper and the paper which is to be wrapped around the same, is supplied from a roll. The sticks of candy are fed from the hopper, by an automatic feed device employing a reciprocating ejecting plunger, and are thereby delivered to an endless parcel carrier, preferably in the form of a wheel having circumferentially spaced peripheral parcel receptacles or pockets. The wrapping paper is delivered over the pockets of this parcel carrier and is automatically cut into sections of the desired length, and the sticks of candy are laid thereon as they are delivered into the pockets, in succession, and they press the paper into these pockets. By the parcel carrier or carrying wheel, the properly located candy sticks and wrapper sections are delivered first to a tucking device and are then rolled against a relatively stationary rolling abutment, and the wrappers are thereby rolled around the sticks of candy. To facilitate this action, the pockets of the parcel carriers are provided with rollers or antifriction wheels against which the sticks of candy and the wrappers are pressed, while the rolling action takes place. The carrier wheel is given intermittent movements, which, in degrees, represent the circumferential distance between its pockets. After the wrappers have been rolled around the sticks of candy, they are delivered into alinement with rotary twisters, and while the said carrier wheel is at rest, these rotary twisters engage the ends of the wrapper and twist the same against the end of the candy stick. As a highly important novel feature of my present invention, the twisters, instead of acting simultaneously, are arranged to operate alternately, or one after the other, to twist the ends of the wrapper. By this alternate or successive twisting action, a very greatly improved result, hereafter fully explained, is attained. All of these actions are automatic and properly timed, of course, in respect to each other. The machine also involves certain other novel, but important features which will be noted in the following detailed description.

In the accompanying drawings which illustrate the invention, like characters indicate like parts throughout the several views.

Figure 3:
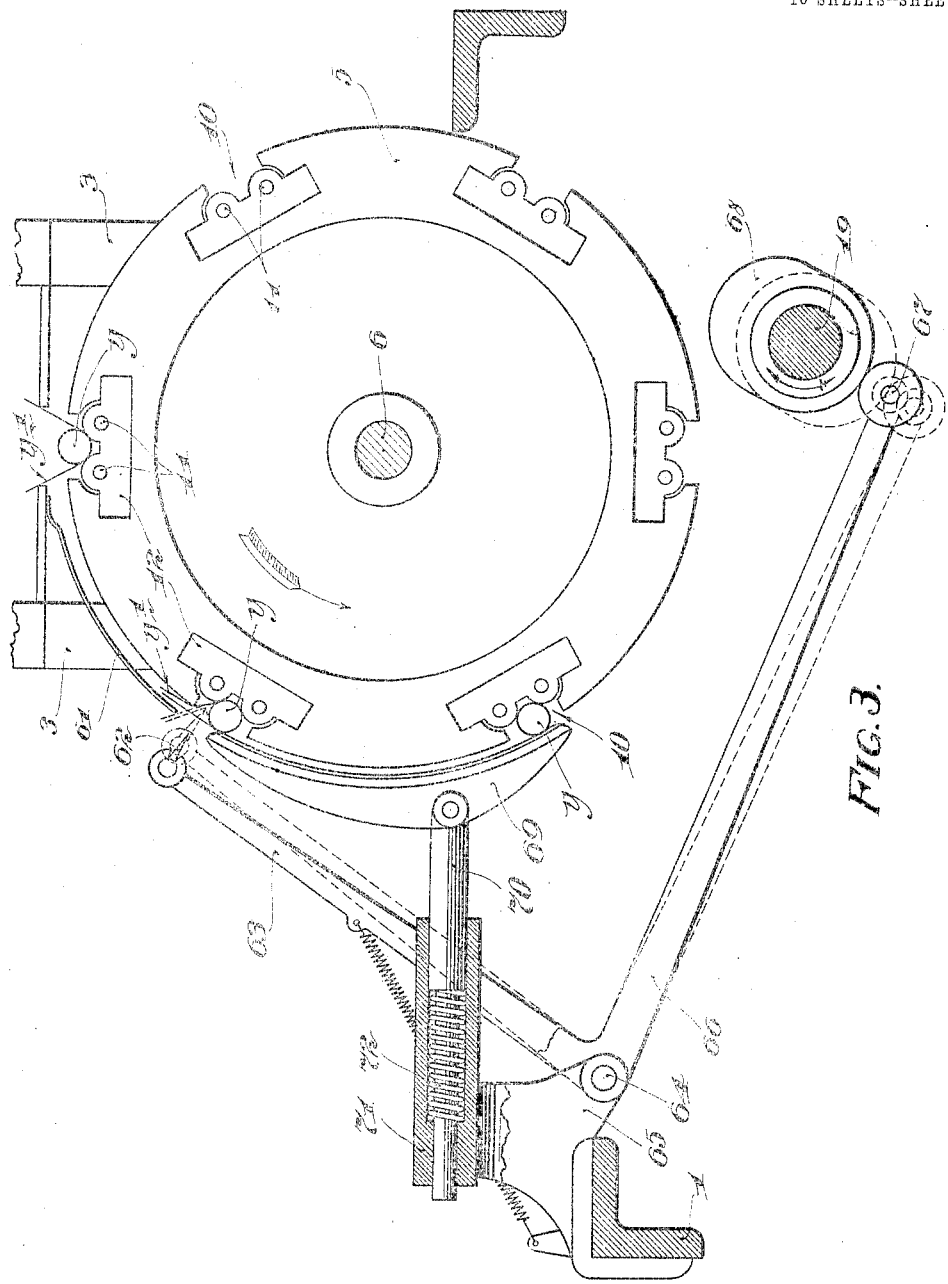
Figure 8:
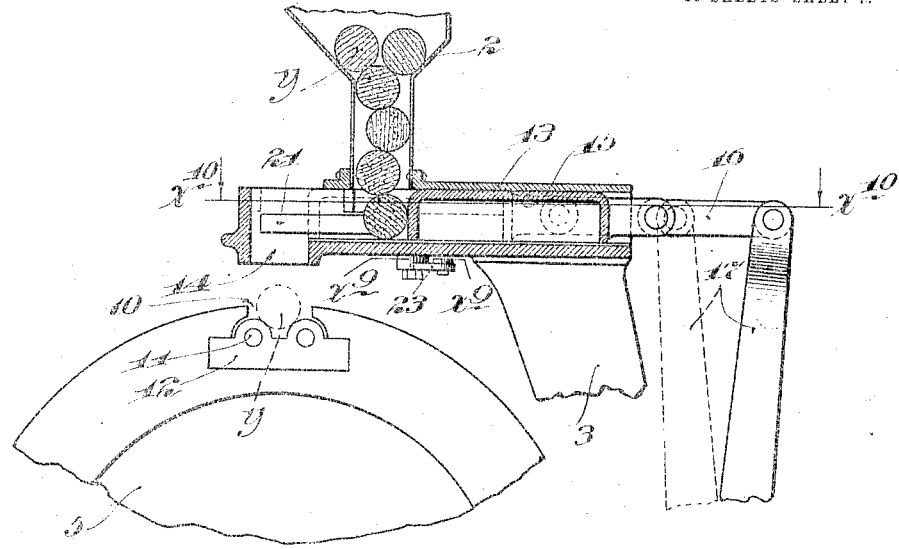
Figures 9, 10:
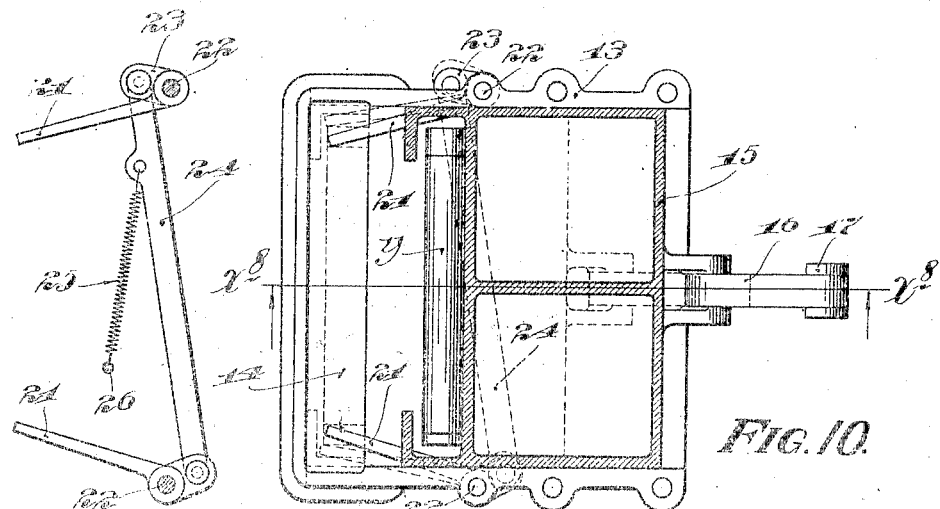
Figure 11:
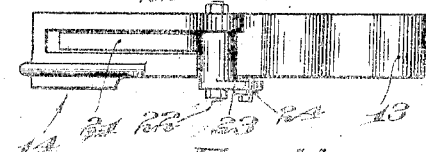
Figure 12:
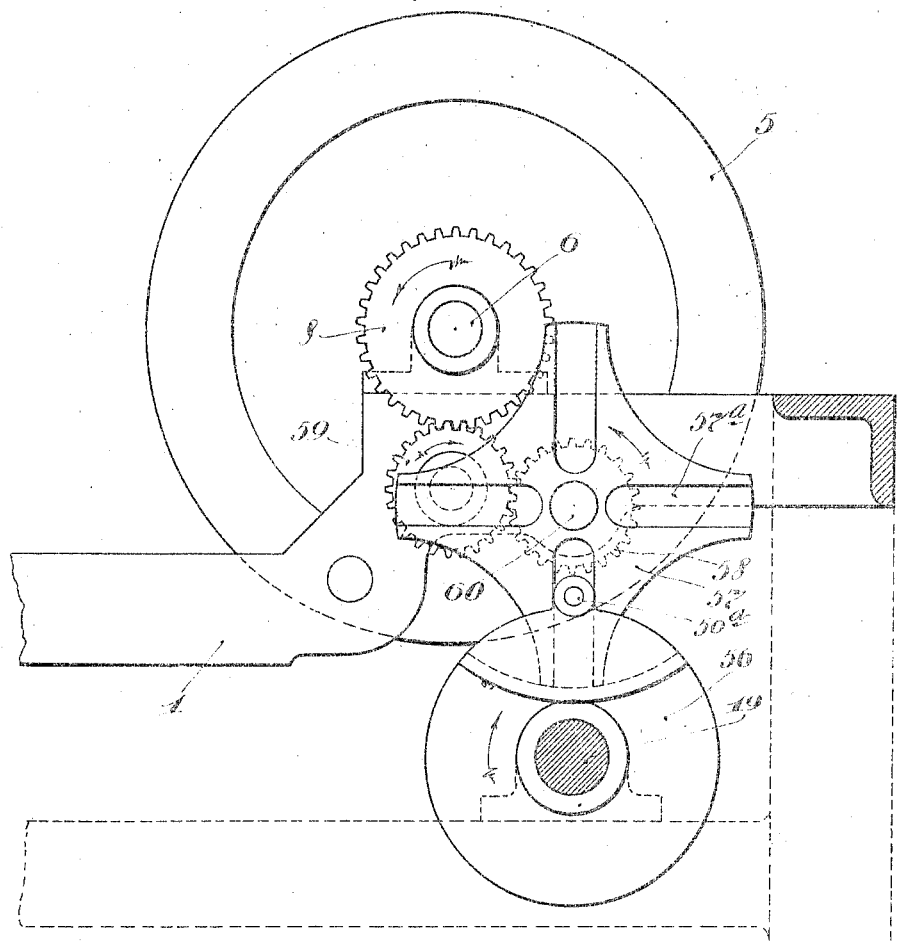
Figures 13, 14:
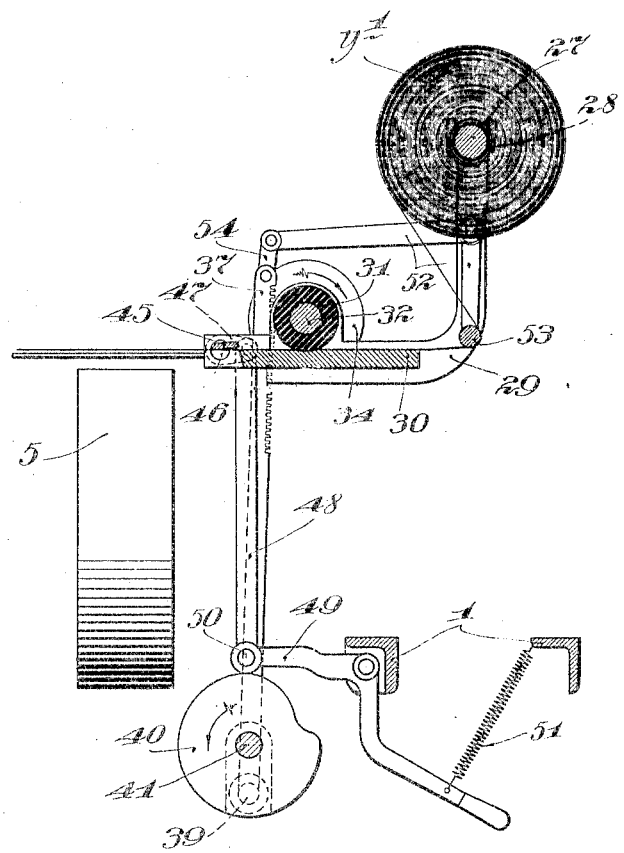

Referring to the drawings, Figure 1 is a front elevation of the improved machine; Fig. 2 is a transverse vertical section taken on the line $x^2$ $x^2$ on Fig. 1; Fig. 3 is a fragmentary view with some parts shown in full elevation, and with some parts sectioned, approximately on the line $x^3$ $x^3$ on Fig. 1; Fig. 4 is an end elevation looking at the machine from left toward the right, in respect to Fig. 1, some parts being broken away and some parts being removed; Fig. 5 is a fragmentary view in enlarged front elevation showing chiefly the parcel carrying wheel and twisters; Fig. 6 is a view chiefly in elevation showing in detail a parcel carrying wheel and coöperating parcel rolling abutment; Fig. 6$^a$ is a detail view in plan showing one of the rollers employed in the pockets of the carrier wheel; Fig. 7 is a horizontal section taken on the line $x^7$ $x^7$ on Fig. 6; Fig. 8 is a vertical section partly in elevation and partly in vertical section on the line $x^8$ $x^8$ on Fig. 10, showing the carrying wheel, the hopper and the feed device, some parts being broken away; Fig. 9 is a detail in horizontal section taken on the line $x^9$ $x^9$ on Fig. 8; Fig. 10 is a horizontal section taken on the line $x^{10}$ $x^{10}$ on Fig. 8; Fig. 11 is a side elevation of the feed device; Fig. 12 is a section taken approximately on the line $x^{12}$ $x^{12}$ on Fig. 1; Fig. 13 is a view chiefly in vertical section approximately on the line $x^{13}$ $x^{13}$ on Fig. 2 but with some parts in full elevation, showing the paper feeding and cutting mechanism; Fig. 14 is a detail in section on the line $x^{14}$ $x^{14}$ on Fig. 4; Fig. 15 is a front elevation of the machine, particularly showing the parcel carrier, the twisters and twister actuating mechanism, other parts being removed from the machine; Fig. 16 is a plan view of one of the twisters removed from the machine; Fig. 17 shows one of the twisters chiefly in longitudinal section; Fig. 18 is a detail view in front elevation showing certain parts found in the vicinity of the line marked $x^{18}$ $x^{18}$ on Fig. 2; Fig. 19 is a detail view in plan, of certain of the driving gears; Fig. 20 is a detail in section taken on the line $x^{20}$ $x^{20}$ on Fig. 15; and Fig. 21 is a detail in section taken on the line $x^{21}$ $x^{21}$ on Fig. 15.

The framework of the machine, which is preferably a cast structure, is indicated as an entirety by the numeral 1, and this framework, directly or indirectly, supports all of the other parts of the machine.

The candy sticks $y$ are placed in parallel arrangement in a supply hopper 2 (see Figs. 1, 8 and 11) supported in an elevated position above the framework 1, as shown, by means of a bracket 3 and a brace rod 4, both of which are rigidly secured at their lower ends to the said framework.

Located below the hopper 2, some little distance, is an endless parcel carrier, preferably in the form of a wide-faced wheel 5 which is secured to a shaft 6, journaled in suitable bearings 7 on the framework, and provided at one end with a spur gear 8.

The parcel carrying wheel 5, for brevity, hereinafter designated as a parcel carrier, is provided with a multiplicity of peripheral pockets or parcel receptacles 10, there being, as shown, six of the said pockets, (see Figs. 2, 3, and 6). These pockets are provided with movable antifriction bottoms afforded by rollers 11, shown as journaled in bearing plates 12 secured to and carried by said carrier 5. The pocket which is in position to receive a stick of candy, is uppermost, and underlies, but is laterally offset from, the discharge spout of the supply hopper 2, as best shown in Fig. 8.

An intermittent feed device coöperates with the discharge spout of the hopper 2, and, as shown, this feed device comprises a horizontally extended box-like feed trough 13 (see Fig. 8) secured to the upper end of the bracket 3, and serving as a means for connecting the hopper 2 to the said bracket. This feed trough 13 has an opening in its top to receive the sticks $y$ from the hopper, and it is provided with a depending discharge passage 14 that immediately overlies the pocket 10, that is in an upturned receiving position.

Working within the so-called feed trough 13 is an ejector or feed head 15, which, as shown, is connected by a link 16 to the upper end of a lever 17, intermediately pivoted to the frame 1. This lever 17 (see Fig. 2), at its lower end, is subject to a cam 18, carried by a counter-shaft 19, journaled in suitable bearings on the frame 1 and provided with various other cams, hereinafter to be noted. A spring 20, attached to the lever 17 and to the frame 1, normally holds the ejector head 15 in a retracted position shown in Fig. 8.

To properly center or locate the candy sticks, endwise thereof, or transversely of the carrier 5, I provide a device comprising a pair of laterally spaced so-called centering arms 21 (see Figs. 9, 10 and 11), that are pivotally connected to outer edges of the bottom of the feed trough 13 by means of short upright shafts 22. The arms 21 work within the trough 13 and their hubs are provided at their lower ends with short arms 23 that project in opposite directions, and are connected by a link 24 (see particularly Figs. 9 and 11). A spring 25, attached to the link 24, is anchored to a stud 26 on the bottom of the trough 13. This spring 25 yieldingly holds the free ends of the centering arms 21 toward each other, as shown in Figs. 8 and 9, and the oblique link 24 causes the arms 21 to partake of simultaneous and equal movements away from each other, when the stick of candy is forced between the same.

The wrapping paper $y^1$, which is preferably supplied from a roll, is shown as located on a spindle 27 rotatively and detachably held by open seats 28, formed on the upper ends of laterally spaced prongs 29 of a table 30, which, in turn, is rigidly supported by brackets $30^a$ rigidly secured on the main frame 1 (see particularly Figs. 1 and 13). The unwound portion of the paper wrapper or ribbon $y^1$ is passed over the table 30 and under a feed roller 31, the shaft 32 of which is journaled in suitable bearings on the table 30. The said roller 31 is preferably made of soft rubber, or otherwise provided with a pliable outer surface which will have a proper frictional adherence to the paper wrapper necessary to feed the same over the smooth upper surface of the table 30. Rigidly secured to the outer end of the roller shaft 32 is a ratchet wheel 33 (see Figs. 2, 13 and 18); and journaled on said shaft, adjacent to said ratchet wheel is a wheel 34 that carries a spur gear 35 and a driving pawl 36, which latter engages the said ratchet wheel 33. The gear 35 meshes with the upper end of a rack bar 37, the upper end of which is suitably guided for approximately vertical movements. The lower end of the rack bar 37 is connected to the radially adjustable wrist pin 39 of a cam 40, which cam is secured to the outer end of a short horizontal shaft 41 (see Figs. 2 and 19), journaled in suitable bearings 42 in the frame 1, and provided at its inner end with a beveled gear 43 that meshes with a beveled gear 44 on the transverse counter-shaft 19, already noted. As is evident, when the shaft 41 and crank equipped cam 40 are rotated, the feed roller 31 will be given an intermittent rotary movement in the direction of the arrow marked adjacent thereto on Fig. 13. Immediately after the wrapper $y^1$ leaves the feed roller 31, it passes under a knife 45 that coöperates with one edge of the table 30 in the shearing action, and is secured to a rock shaft 46 (see Figs. 2 and 13), journaled in suitable bearings on the bracket 3 and provided at its outer end with a short crank arm 47 (see also Figs. 1 and 13). This arm 47 is connected by a link 48 to one arm of a lever 49, which, as shown, is intermediately pivoted to the frame 1 and is provided at one end with a roller 50 that rests upon and is subject to the cam 40 of the shaft 41. A coiled spring 51 anchored to the frame 1 and attached to the lever 49 yieldingly holds the roller 50 seated on the cam 40, and when the depression in said cam reaches said roller, said spring forces the knife 45 downward to cause it to sever or cut from the wrapper, that section of the wrapper which has been projected over the uppermost pocket 10 of the carrier wheel 5 (see Fig. 13). By pressing on the extended end of the lever 49, however, the knife 45 may be raised, whenever desired, to facilitate the initial passage of the wrapper under the knife.

In connection with the feed mechanism above described, I provide a slack take-up device for action on the unwrapped portion of the wrapper. This slack take-up device comprises a bell crank 52 intermediately pivoted to one of the arms 29 and provided at one end with a laterally projecting guide pin 53, and at its other end, connected by a short link 54 to the upper end of the rack bar 37. The paper feeding movement of the roller 31 is produced by an upward movement of the rack bar 37, and under such movement, the guide pin 53 recedes from the ribbon and permits the same to be freely fed by the said roller. The roller 31 stands still under downward movement of the rack bar 37, and under such movement, the guide pin 53 is moved against the ribbon and unwinds from the roll, sufficient paper for the next feeding action, to-wit, enough paper to form the next wrapper for a stick of candy.

Power for running the machine will be transmitted through a belt, not shown, but which will run over a large pulley 55 on one end of the continuously running shaft 19 (see Fig. 1). The parcel carrier 5 receives its intermediate rotary movement from the shaft 19, through a Geneva stop gear 56–57, and spur gears 58, and 59, and the gear 8, which, as noted, is secured on one end of the parcel carrier shaft 6. Of the parts of the Geneva gear, the member 56 is a driving member carried by the shaft 19 and provided with the customary crank acting roller $56^a$ that works in radial grooves $57^a$ of the driven wheel or member 57 (see particularly Figs. 1 and 12). The said wheel 57 is secured on a short shaft 60 journaled in suitable bearings on the frame 1 and carrying the gear 58 at its inner end. Said intermediate gear 59 is journaled in a suitable bearing on the frame 1 and meshes with the gears 58 and 8.

Fig. 3 illustrates the position of a candy stick $y$ and a severed wrapper $y^1$, immediately after they are deposited in the uppermost pocket of the parcel carrier 5. The next following movement of the carrier 5 will carry the upturned flaps of the wrapper $y^1$ under a segmental guard plate 61 which is suitably secured to one of the brackets 3. The first intermittent movement of the parcel carrier 5 carries this first parcel or stick $y$ just below the lower edge of the plate 61, but the said plate then holds both edges of the wrapper $y^1$ turned backward under the said plate 61, so that the outer flap is adapted to be tucked inward between the inner flap and the stick, by means of a so-called tucker blade 62, carried by the upper ends of a pair of spring retracted arms 63 secured to a short rock shaft 64 journaled in a suitable bearing 65 on one of the bars of the frame 1 and provided with a lower arm 66 having at its free end a roller 67 that is subject to a cam 68 carried by the continuously running shaft 19 (see Figs. 1, 2 and 3).

The cam 68 operates on the roller 67 and causes the tucker blade 62 to move, as indicated by dotted lines in Fig. 3, and thereby tuck the outer flange of the wrapper $y^1$, as above just stated, at a time when the parcel carrier 5 remains stationary.

The second step of rotary movement imparted to the parcel carrier 5 after the stick and wrapper have been applied in an uppermost pocket thereof, carries the said stick and its wrapper against the concave surface of a segmental wrapper rolling abutment, in the form of a bar 69, shown as intermediately pivoted to the projecting end of a plunger 70 mounted in a sleeve-like guide 71 of the bearing 65. A coiled spring 72 placed within the sleeve 71 re-acts against the latter and against the plunger 70 with a force that yieldingly holds the concave surface of the bar 69 pressed toward the periphery of the carrier 5. When the stick $y$ with the wrapper $y^1$ tucked around the same, is lowered into frictional engagement with the concave surface of the abutment or bar 69, the loose flaps of the wrapper will be completely rolled up around the said stick, and at the next stop of the carrier 5, this stick with its wrapper rolled around the same, will stand in the position shown in Fig. 3, in contact with the lower end of the said bar 69, and then stands firmly held by the said bar and the rollers 11 of the carrier 5. Obviously, the above rolling action of the wrapper takes place under frictional engagement with the bar 69, because the frictional engagement therewith is sufficient to cause the rollers 11 to rotate when the carrier wheel is given its intermittent rotary movement. As a means for further insuring the rolling action, above described, the rollers 11 (see Figs. 6 and 6ᵃ), are provided with projecting ends 11ᵃ, which, during the time that the stick is engaged with the convex surfaces of the rolling bar 69, are pressed against an auxiliary rolling bar 73. This bar 73, as shown, has a stem 74 seated in a fixed guide disk 75 and pressed radially outward by a coiled spring 76.

While the stick $y$ with the wrapper $y^1$ completely wound around the same, is held in the position last noted, to-wit, in what may be designated as its third or twisting position, the ends of the wrapper, which project beyond the stick, are twisted by means of twisting devices which will now be described.

The twisters illustrated herein are preferably of the same construction as those disclosed in my prior Patent 929,075, of July 27th, 1909, but the present machine involves an improved means for operating these twisters whereby they are caused to produce the twist alternately or one after the other. Located on each side of the space occupied by the parcel carrying wheel 5, and axially alined with each other and with the stick of candy which is at the above noted third position, or so-called twisting position, are the twisters best shown in Figs. 5, 15, 16 and 17.

A pair of twisting fingers 104 are pivotally connected to the bifurcated end of a sleeve 105 journaled in a bearing 106 on the frame 2 and provided, at its inner end, with a wide-faced spur pinion 107. Extended into the sleeve 105 and slidable in a bearing 108 on the frame 2, is a non-rotary sleeve 109 that is provided with an axially extended slot 110. At their pivoted ends, the fingers 104 are provided with short inwardly projecting lugs 111 that work in the grooved end of an operating plunger 112 slidably mounted within the non-rotary sleeve 109 and provided with a radially projecting pin 113 that projects through the slot 110 of said sleeve; and also works in a spiral groove 114 of a collar 115, which latter is mounted to rotate upon the non-rotary sleeve 109, but is held against sliding movement in respect thereto. The collar 115 is provided with longitudinally spaced ears 116 that support a small rod 117, the axis of which is parallel to the common axes of the sleeves 105—109.

As is evident, when the collar 115 is oscillated, its spiral groove 114, operating on the pin 113, will cause said pin to travel in the groove 110 of the non-rotary sleeve 109, thereby imparting endwise movement to the rod or plunger 112; and this movement of the said rod, in a direction from the right toward the left with respect to Fig. 15, will close the twisting fingers, while reverse movement of said plunger will, of course, open up the said fingers. The groove in the head of said plunger, of course, permits the twisting fingers to freely revolve around the non-rotary plunger 112.

Oscillatory movement is imparted to the cam acting collar 115 from a cam 119 carried by the shaft 19 and operative on a roller equipped stud 120 of a spring-pressed lever 121, the free end of which lever is connected, by a link 122, to the rod 117 of said collar 115 (see Figs. 1 and 2). The rod 117 is adapted to slide through the connected end of the link 122, and suitable stop devices, not shown, should be provided for holding the said link 122 against lateral movements.

In moving the two twisters simultaneously toward each other and simultaneously away from each other, shipper collars 138 are loosely mounted on the hollow spindles 109 between the gears 107 and the collars 115 (see Figs. 15, 16 and 17). These collars 138 are pivotally connected to the bifurcated end of levers 135 that are pivotally supported at 139 and are subject to cams 134 carried by the shaft 19. The lower ends of the levers 135 are yieldingly pressed against the cams 134 by means of springs, not shown. It may be here stated that the mechanism above just described, for opening and closing the fingers of the twisting device, and for moving the said twisting device axially toward and from each other, are substantially identical with the mechanism more fully disclosed in my said prior Patent 929,075, and that the corresponding parts bear like numerals, which numerals run from 104 to 139. In my said prior patent, the ends of the wrapper were simultaneously twisted in opposite directions, or in other words, were reversely twisted during the same interval of time. I have found that the best results can be obtained by twisting the ends of the wrapper in the same direction, but at different times. Hence, I provide a novel arrangement whereby the two twisters will grip the ends of the wrapper, preferably simultaneously and move simultaneously toward the end of the article to be wrapped, to thereby give slack to the end of the wrapper to be twisted, and then one twister is rotated to twist the one end of the wrapper, and immediately thereafter, the other twister is rotated to twist the other end of the wrapper. I have found that when both ends of the wrapper are simultaneously twisted in reverse directions, that the outer edges of the wrapper will be distorted and not folded flat or straight, and that when both ends of the wrapper are simultaneously twisted in the same direction, that the outer edge of the wrapper, between twists, will be bulged outward. However, when the one end of the wrapper is first twisted, the slack produced in the edge of the wrapper by this first twist, will be taken up by the second twist. The mechanism for accomplishing this alternate twist in the opposite ends of the wrapper is preferably as follows, attention being directed particularly to Figs. 1, 4, 14, 15, 17, 20 and 21:

The wide-faced pinions 107 on the twister sleeves 105 mesh with segmental gears 140 secured to a counter shaft 141 journaled in suitable bearings on the frame 1 and provided at its left hand end, as viewed in Figs. 1 and 15, (see also Fig. 4), with a ratchet wheel 142 rigidly secured thereto. Loosely journaled on the shaft 141, adjacent to the ratchet wheel 142 is a flanged sleeve 143 provided with a spur gear 144 on its hub. The flange of the sleeve 143 is provided with a spring-pressed dog 145 that engages with the ratchet wheel 142. The pinion 144 meshes with the teeth of a rack bar 146 that is arranged to slide through a keeper 147 that is pivotally hung on the said shaft 141. The lower end of the rack bar 146 is pivotally connected to a crank 148 carried by the left hand end of the continuously running shaft 19. The throw of the crank 148 should be such that the shaft 141 will be given one rotation for each rotation of the shaft 19, which, however, will, of course, take place during approximately one-half of the time required for the rotation of the said shaft 19.

By reference particularly to Figs. 20 and 21, it will be noted, that one of the twisters will be given its rotary movement during the first half rotation of the shaft 141 and that the other twister will be given its rotary movement during the second half of the rotation of the said shaft. Hence, the twisting of the ends of the wrapper will be done in succession while the constantly running shaft 19 is making a half rotation and the closing and opening movements of the fingers of the twisters and the movements of the twisters axially toward and from each other, will take place while the twisters are held so that they cannot rotate.

The twisters are preferably each given about one and one-half rotation in the twisting action, and they will always be brought to a standstill or to normal position with the twisting fingers properly located and properly spaced to receive the untwisted ends of the wrapper between them.

As best shown in Fig. 5, the guide disk 75 is held against rotation by a set screw 9 which works through a lug 7ª on one of the bearings 7 and is seated in the long sleeve-like hub 75ª.

What I claim is:

1. In a parcel wrapping machine, means for applying wrappers to parcels, and a pair of twisters engageable with the opposite ends of an applied wrapper and arranged to first twist one end of said applied wrapper and subsequently the other end thereof in the same direction.

2. In a parcel wrapping machine, the combination with a parcel carrier and means coöperating with said carrier to apply wrappers to the parcel, of a pair of twisters having fingers engageable with the opposite ends of applied wrappers, and means for alternately rotating said twisters to twist the ends of the wrappers.

3. In a parcel wrapping machine, the combination with an intermittently movable parcel carrier and means coöperating therewith to roll wrappers around the parcel, of a pair of axially alined twisters having fingers engageable with the opposite ends of the applied wrappers, the said twisters being movable axially toward and from each other, and means for rotating said twisters in the same direction but at different times, to thereby twist the ends of the wrapper, one after the other in the same direction.

4. In a parcel wrapping machine, the combination with an endless parcel carrier and means for intermittently moving the same, of devices coöperating with said carrier to roll wrappers around the parcels, a pair of axially alined twisters having fingers engageable with the opposite ends of the applied wrappers, means for opening and closing the fingers of said twisters, and for moving the said twisters bodily toward and from each other with properly timed actions, and automatic means for rotating said twisters, one after the other in the same direction.

5. In a parcel wrapping machine, the combination with an endless parcel carrier and means for intermittently moving the same, of devices coöperating with said carrier to roll wrappers around the parcels, a pair of axially alined twisters having fingers engageable with the opposite ends of the applied wrappers, means for opening and closing the fingers of said twisters, and for moving the said twisters bodily toward and from each other with properly timed actions, the said twisters having pinions, and a pair of segmental gears set one ahead of the other driven at the same speed and engageable with the said pinions to rotate said twisters in succession.

6. In a parcel wrapping machine, the combination with an endless parcel carrier and means for intermittently moving the same, of devices coöperating with said carrier to roll the wrapper around the parcel, a pair of twisters, one on each side of said carrier, arranged to engage opposite ends of a wrapper applied to the parcel carried by said carrier, and alternately operated means for rotating said twisters in the same direction and at different times.

7. In a parcel wrapping machine, the combination with a rotary parcel carrier and means for supplying wrappers and parcels thereto, the said parcel carrier having pockets equipped with bearing rollers, of a segmental rolling abutment against which the parcels having wrappers applied thereto are forced by the rollers in said pockets, whereby the wrappers are rolled around the parcels under rotation of said carrier, the said abutment being spring-pressed and pivotally supported.

8. In a parcel wrapping machine, the combination with a rotary parcel carrier and means for supplying wrappers and parcels thereto, the said parcel carrier having pockets equipped with bearing rollers, of a segmental rolling abutment against which the parcels having wrappers applied thereto are forced by the rollers in said pockets, whereby the wrappers are rolled around the parcels under rotation of said carrier, and a segmental rolling bar opposed to said segmental abutment and engageable with a projecting end of a parcel to insure rolling of the wrapper around the same.

9. In a parcel wrapping machine, the combination with a rotary parcel carrier and means for supplying wrappers and parcels thereto, the said parcel carrier having pockets equipped with bearing rollers, of a segmental rolling abutment against which the parcels having wrappers applied thereto are forced by the rollers in said pockets, whereby the wrappers are rolled around the parcels under rotation of said carrier, and a disk-like track located adjacent to one side of said carrier and provided with an outwardly spring-pressed segmental rolling bar opposed to the said segmental abutment and coöperating therewith to insure rolling of the wrappers around the parcels.

10. In a parcel wrapping machine, the combination with a rotary parcel carrier having pockets adapted to receive wrappers and parcels, of means for supplying the wrappers to said pockets, means for applying the parcels in said pockets and upon said wrappers, an intermittently operative tucker serving to force one edge of the wrapper under the other, a segmental rolling abutment against which the parcels are forced to thereby rotate said parcels and roll the wrappers around the same, under rotary movement of said carrier.

11. In a parcel wrapping machine, the combination with a rotary parcel carrier having pockets adapted to receive wrappers and parcels, of means for supplying the wrappers to said pockets, means for applying the parcels in said pockets and upon said wrappers, an intermittently operative tucker serving to force one edge of the wrapper under the other, a segmental rolling abutment against which the parcels are forced to thereby rotate said parcels and roll the wrappers around the same, under rotary movement of said carrier, and twisters on opposite sides of said carrier wheel arranged to twist the ends of the wrappers while the parcels are still held by said carrier and rolling abutment.

12. In a machine of the character set forth, the combination of a conveyer for a sheet of flexible material and the article to be wrapped, means on said conveyer for causing said article to extend thereon transversely of the path of movement of said conveyer and against said sheet, a movable tucker member supported on the machine for tucking an edge portion of the sheet beneath the other edge portion thereof, and a member located adjacent to said conveyer and against which said article, with said sheet interposed, is rolled in the movement of said conveyer, for the purpose set forth.

13. In a machine of the character set forth, the combination of a conveyer for a sheet of flexible material and the article to be wrapped, means on said conveyer for causing the article to extend thereon transversely of the path of movement of said conveyer and against the sheet between its forward and rear edges and the ends thereof, a movable tucker member supported on the machine for tucking the forward edge of said sheet beneath the other edge portion thereof, and a member located adjacent to said conveyer and against which said article, with said sheet interposed, is rolled, for the purpose set forth.

In testimony whereof I affix my signature in presence of two witnesses.

WALTER W. BUHSE.

Witnesses:
 EDITH HANNA,
 HARRY D. KILGORE.